Patented June 13, 1939

2,161,815

UNITED STATES PATENT OFFICE 2,161,815

CHEMICAL PROCESS

Frederick C. Hahn, Wilmington, Del., assignor, by mesne assignments, to E. I. du Pont de Nemours and Company, Wilmington, Del., a corporation of Delaware No Drawing. Application November 13, 1935, Serial No. 49,460

23 Claims. (Cl. 260—231)

This invention relates to the preparation of the intimate mixture of cellulose, alkali and water commonly known as alkali cellulose. It relates also to the use of alkali cellulose prepared by this process as an intermediate in the preparation of cellulose derivatives particularly cellulose ethers and more particularly ethyl cellulose of the quality required for use in films having the maximum degree of transparency.

For the preparation of cellulose derivatives, alkali cellulose has been prepared with the components, i. e., cellulose, alkali and water present in a great variety of proportions, depending on the final product to be prepared. In preparing these compositions, the art has experienced certain inherent difficulties in bringing together the components of the alkali cellulose in the required proportions and in uniform distribution. In the past these difficulties have been met only in part and by the introduction of expedients which are not only troublesome and wasteful of material but which involve a considerable degree of deterioration of the cellulose molecule thereby adversely affecting the quality of the final product.

In general, the useful range of alkali cellulose compositions call for the addition to the cellulose of a volume of caustic alkali solution which is much less than that which would be required to wet the cellulose thoroly and to distribute the alkali uniformly therethru. One requirement for a good quality of cellulose ether is uniform distribution in the alkali cellulose and one method of obtaining uniform distribution has been to steep the cellulose in an excess volume of caustic liquor and press off the excess. Where the proportion of alkali is not too high with respect to the water, this method may be used and a press cake obtained having a fair degree of uniformity. However, the press cake must be shredded or otherwise comminuted before etherification and this operation invariably involves injury to the cellulose due to oxidation and this, in turn, adversely affects the quality of the final product. The shredding operation also involves the difficulty that a portion of the alkali cellulose is left in the form of dense nodules which are not readily penetrated by the etherifying agent and it appears that this further contributes to the production of cellulose ether of poor uniformity and of imperfect transparency.

In the experience of the art a still more serious difficulty arises when high grade cellulose ethers are to be prepared. In this case it has been found desirable to have present an amount of alkali which is more than that which can be dissolved at normal temperature in the water which should be present during etherification. The principal expedients which have been used to meet this situation include the following:

1. Cellulose is treated with an excess volume of water containing the required amount of alkali in solution and the excess water is evaporated before etherification.

2. Cellulose is steeped in an excess volume of caustic solution, the excess is pressed off, leaving a deficiency of alkali which deficiency is supplied by incorporating with the press cake either solid alkali or concentrated alkali solution, followed by etherification.

3. Cellulose is incorporated with a hot solution containing the required amount of alkali and water and the etherifying agent is then added.

4. Cellulose is ground with solid caustic in an inert liquid after which water and the etherifying agent are added.

5. Cellulose is ground and stirred into a slurry of solid alkali in an inert liquid. To this mixture water is added, followed by the etherifying agent.

In all of these processes, the cellulose suffers injury due to contact with concentrated caustic alkali under conditions which favor oxidation either because of the extended period of contact or because of the high temperature. I find that injury of this nature affects both the clarity and the color of the finished cellulose ether.

This invention has as an object the provision of an improved and simplified process of preparing the intimate mixture of cellulose, alkali and water, commonly known as alkali cellulose. A further object is the preparation of alkali cellulose of any desired composition without subjecting the cellulose to injury due to oxidation in presence of alkali. A further object is to provide an improved method of preparing alkali cellulose of low water and high alkali content. A still further object is the provision of an improved method of preparing cellulose ethers specifically ethyl cellulose for use in the preparation of transparent films of maximum quality as to clarity and color.

These objects are accomplished by the following process wherein alkali is dissolved in water in the proportion necessary to meet the composition requirements of the alkali cellulose. If necessary heat is used to aid solution. The solution of alkali is emulsified by agitating with an inert liquid, for example, benzene. The cellulose is then mixed with the emulsion whereupon the fine globules of caustic solution are transferred from the emulsion to the cellulose causing the emulsion to break. After a period of mixing the inert liquid will be found to be clear and free of globules of caustic solution and the alkali will be uniformly distributed thruout the cellulose. There results a suspension of alkali cellulose in the inert liquid and to this suspension the appropriate etherifying agent, for example, ethyl chloride, is added and the reaction mixture is heated to effect the etherification.

In the above process the emulsion with which the cellulose is mixed contains no excess, either of water or of alkali, over that desired in the alkali cellulose, or over that desired in subsequent etherification. In general the cellulose is added to an emulsion which contains just the desired amount of both alkali and water. However, in some cases it is preferred to use in the emulsion only a portion of the required alkali and to add the remainder of the alkali to the suspension of alkali cellulose in the inert liquid. This modification has the advantage that the more dilute alkali has a greater swelling effect on the cellulose, which seems to favor an increase in the rate of etherification.

Thruout practically the entire range of useful alkali cellulose composition the requirement is for proportions of water and alkali and cellulose which correspond to a volume of caustic alkali solution which is much less than the volume which would be required to wet the cellulose thoroly and to distribute the alkali uniformly therethru. The process of this invention is advantageously applied to prepare alkali cellulose of any desired composition but it is of particular advantage in the preparation of alkali cellulose of low water and high alkali content such as is used in the preparation of high grade ethyl cellulose. The art has heretofore experienced difficulty in preparing alkali cellulose having a low water content and a high alkali content, especially where the requirement is for more alkali than can be dissolved in the limited amount of water which is present. In the case where the alkali is sodium hydroxide, this situation occurs when the requirement is for alkali cellulose containing more than about 125 parts alkali per 100 parts water or in other words where the caustic solution which is to be mixed with the cellulose is to contain more than about 56% alkali. In this situation the process of this invention shows to great advantage. The required amount of alkali is dissolved in the required amount of water with the aid of heat and an emulsion is prepared by agitating this solution with an inert liquid. The cellulose is then stirred into the hot emulsion. In this operation the caustic alkali is readily transferred to the cellulose and uniformly distributed thereon. In the resulting suspension of alkali cellulose in the inert liquid the alkali cellulose is well protected from oxidation during the brief period in which the cellulose is subjected to contact with hot alkali prior to the addition of the etherification agent.

The composition of alkali cellulose suitable for use in etherification varies widely. The water content may vary for example from about 40 to about 300 parts and the alkali from about 40 parts to about 400 parts per 100 parts of cellulose. Any of these compositions may be readily prepared by the process of this invention. For the preparation of cellulose ether of the highest grade, for example, ethyl cellulose for transparent films, I prefer to use alkali cellulose containing from about 80 to 150 parts of water per 100 of cellulose, and containing at least 125 parts and preferably around 200 parts of caustic alkali per 100 parts of water. In some cases even higher ratios of alkali may be used. Alkali cellulose within this range of composition may be prepared by dissolving all of the alkali in the water with the aid of heat and agitating the hot alkali solution with an inert liquid, for example, benzene, until the emulsion is formed. The cellulose is now stirred into the emulsion forming a suspension of the alkali cellulose in benzene. If preferred, the water, alkali and benzene may be heated and agitated together with or without an emulsifying assistant until the alkali is dissolved and the solution is emulsified in the benzene. Obviously also the mixture of water and alkali may be replaced by a mixture of alkali and concentrated solution of alkali in the proper proportion.

As a modification of this process I may dissolve a part of the required alkali in the required amount of water to form a solution of mercerizing concentration, that is, a solution containing from about 12 to about 50% alkali. This solution is then emulsified by agitating with the benzene and the first stage alkali cellulose is formed by stirring the cellulose into the emulsion. The remainder of the required alkali is then added to this suspension in the form of flakes or as a slurry in benzene or other inert liquid after which the etherifying agent is added and the mixture is heated until the etherification is complete.

The emulsion of caustic alkali solution in the inert liquid consists of extremely fine globules of caustic solution dispersed in the liquid. On mixing the emulsion with the cellulose the caustic solution is distributed readily and with remarkable uniformity thruout the cellulose.

Having thus outlined the general purposes and principles of operation, the following exemplifications, wherein all quantities are expressed as parts by weight, are added for purposes of illustration but not in limitation:

*Example 1*

This example represents the direct preparation of an intimate mixture of cellulose and alkali of low water content and high caustic alkali content for use in the preferred procedure for the preparation of ethyl cellulose.

Two hundred and forty parts of solid caustic soda, 120 parts of water, 560 parts of benzene, and one part of ethyl cellulose are mixed and heated at about 70° C. until the solid caustic has dissolved in the water and the resulting solution has been emulsified with the benzene. The resulting emulsion is charged into an autoclave and 100 parts of granulated high alpha cellulose wood pulp board (high alpha wood pulp board cut into chips about 1/8 x 1/16 x 1/16") is added to the emulsion while agitating. The mixture is agitated for about one half hour at 70–90° C., or until the inert diluent is substantially free from caustic solution, e. g., clear. As little as fifteen minutes' mixing may be sufficient. Two hundred and eighty parts of ethyl chloride is then added and the resulting mixture is agitated and heated for eight to ten hours at 130–150° C. The reaction mixture consists of a solution of ethyl cellulose in benzene, alcohol and diethyl ether (the last two are by-products), in which are suspended crystals of salt and excess caustic alkali solution. This mixture is treated with water and agitated to dissolve the salt and form an emulsion. An emulsification assistant such as Turkey red oil may be used with advantage in the formation of this emulsion. The resulting emulsion is steam distilled while agitating to remove the volatile solvents. After the volatile solvents are removed, the crude ethyl cellulose remains as a finely divided solid suspended in the alkaline salt residual liquor. The ethyl cellulose is filtered; washed free of most of the alkali and salt by several treatments with hot or boiling water; treated with dilute acid (sulfuric, hydrochloric, nitric, acetic, etc.) to neutralize the remaining alkali; washed with water to remove most of the acid; treated with very dilute solution of alkali or ammonia to neutralize the remaining trace of acid; washed to neutrality with water; and then dried. The product dissolves in toluene-alcohol and many other organic solvents. The solutions are characterized by a high degree of clarity and the substantial absence of color.

An intimate mixture of cellulose and caustic alkali of high alkali and low water content may also be prepared by treating cellulose with an emulsion of a caustic alkali solution of lower concentration, i. e., 50% or less, in an inert diluent and then mixing solid caustic alkali with the resulting intimate mixture of cellulose and caustic alkali solution as illustrated by the following Examples 2, 3, and 4. This modification has an advantage in that the dilute alkali solution is a more effective swelling agent for the cellulose.

Example 2

One hundred seventy parts of a 29.4% caustic soda solution is emulsified in 560 parts of benzene. To this emulsion are added, while violently stirring, 100 parts of granulated wood pulp board. The mixture is agitated for about one hour at ordinary temperature. To the resulting suspension of alkali cellulose in benzene, 190 parts of solid caustic soda are added in the form of flake or as a slurry in benzene and then, either directly or after thoroly mixing the solid caustic alkali with the intimate mixture of cellulose and caustic alkali solution, 280 parts of ethyl chloride are added. The resulting mixture is agitated, heated gradually to 150° C. and maintained at this temperature for 8-10 hours. The resulting ethyl cellulose after isolation and purification by the known methods, is of the same high quality described previously.

The conditions in the foregoing example may be varied. For instance, the concentration of the caustic solution emulsified with the benzene may be varied. Also, the emulsion of the caustic solution in benzene may be made by mixing water, solid caustic alkali and benzene in such proportions as to give a caustic alkali solution emulsion of the composition given.

Example 3

Fifty parts of solid caustic soda, 184 parts of water, 500 parts of diethyl ether, and one part of ethyl cellulose are mixed at ordinary temperature until the solid caustic dissolves in the water and the resulting caustic solution becomes emulsified in the ether. This emulsion is added to an autoclave, 100 parts of granulated wood pulp board is introduced and the mixture is agitated for about one hour at ordinary temperature. To the resulting alkali cellulose, 190 parts of solid caustic soda and 280 parts of ethyl chloride are added and the resulting mixture is agitated and heated for 6-10 hours at 130°-160° C. The solid alkali may be added as such or as a slurry in benzene, diethyl ether, etc. The ethyl cellulose is isolated and purified by the known methods. The resulting purified ethyl cellulose gives solutions in various organic solvents that are characterized by a high degree of clarity, freedom from insoluble fibers and substantial absence of color.

Example 4

This exemplifies the use of a solution of caustic alkali to furnish the water necessary to the alkali cellulose manufacture and treatment with further solid caustic alkali.

Two hundred and thirty-four parts of 22% caustic soda solution, 500 parts of diethyl ether, and one part of ethyl cellulose are mixed at ordinary temperature until the caustic solution becomes emulsified in the ether. This emulsion is introduced into an autoclave, 100 parts of granulated wood pulp board added and the mixture agitated for about one hour at ordinary temperature. To the resulting alkali cellulose, 190 parts of solid caustic soda and 280 parts of ethyl chloride are added and the resulting mixture is agitated and heated for 6-10 hours at 130°-160° C. The ethyl cellulose is isolated and purified by the known methods. The resulting purified ethyl cellulose gives solutions in various organic solvents that are characterized by a high degree of clarity, freedom from insoluble fibers and substantial absence of color.

Other caustic concentrations e. g., 18%, 25%, 30%, 40%, or even as high as 50% at room temperature or as high as 60% or 75% at elevated temperatures of emulsification may be used.

Example 5

In this example, an alkali cellulose of low caustic content is prepared by the emulsion process, ethylated to a low degree with part of the ethyl chloride, and then treated with additional alkali in solid form and a further quantity of ethyl chloride.

Forty-seven parts of solid caustic soda, 112 parts of water, 500 parts of benzene, and one part of ethyl cellulose are agitated at ordinary temperature for about one hour. An emulsion or an extremely fine dispersion of the caustic solution in the benzene is formed. To this emulsion in an autoclave, 100 parts of granulated wood pulp board is added and the mixture agitated for one half hour at ordinary temperature. The resulting alkali cellulose is treated with 100 parts of ethyl chloride and the resulting mixture agitated and heated at 135° C. for two hours. To this reaction mixture are added 180 parts of ethyl chloride and 190 parts of caustic soda. The mixture is agitated and heated to 150° C. and maintained at this temperature for about eight hours. The resulting ethyl cellulose is isolated and purified in the regular way.

Example 6

This example describes the use of the new process in the preparation of benzyl cellulose.

Two hundred and thirty-six parts of solid caustic soda, 119 parts of water, 540 parts of toluene, and one part of benzyl cellulose are mixed and heated at about 70° C. for one hour. During this period the caustic dissolves in water and forms an emulsion with the toluene. To this dispersion is added 100 parts of high alpha cellulose wood pulp in the form of granulated wood pulp and the mixture is agitated for about one hour, the temperature being maintained at 70°-90° C. The resulting alkali cellulose is treated with 550 parts of benzyl chloride, the mixture is agitated, and the temperature is gradually raised to 110° C.

and maintained at this temperature for about ten hours. The resulting benzyl cellulose is isolated and purified in the known manner. It gives solutions in organic solvents (for example, toluene-alcohol) of a high degree of clarity and low color and is particularly suited for the manufacture of high quality plastics, films, lacquers, etc.

*Example 7*

In this example, alkali cellulose of low caustic content, prepared by the new process, is treated with ethylene oxide to form a low substituted glycol cellulose which then is ethylated by treatment with ethyl chloride and additional alkali in solid form.

Fifty parts of solid caustic soda, 184 parts of water, 500 parts of benzene, and one part of ethyl cellulose are mixed at ordinary temperature to form an emulsion. To this emulsion in an autoclave is added 100 parts of wood pulp in the form of granulated pulp board and the mixture is agitated at ordinary temperature for about one hour. The resulting alkali cellulose mixture is treated with 27 parts of ethylene oxide and agitated for about six hours at ordinary temperature. There results considerable heat of reaction and the temperature may rise to 40° C. The resulting mixture is treated with 186 parts of solid caustic soda, 280 parts of ethyl chloride, and then agitated and heated at 150° C. for eight hours. The resulting mixed ether of cellulose gives solutions and films of excellent qualities. In place of ethylene oxide as a pretreating agent, ethylene chlorohydrin may be used.

*Example 8*

This example is similar to the previous example except methyl chloride is used as a pretreatment to make a low substituted methyl cellulose which is then ethylated.

Forty-eight parts of caustic soda, 185 parts of water, 560 parts of benzene, and one part of ethyl cellulose are mixed at ordinary temperature to produce an emulsion or extremely fine dispersion of caustic solution in benzene. To this solution is added 100 parts of granulated wood pulp board and the mixture agitated for one half hour. Thirty-one parts of methyl chloride is added and the resulting mixture heated and agitated for four hours at 110° C. This mixture is then treated with 180 parts of caustic soda, 280 parts of ethyl chloride, and agitated and heated at 145° C. for about seven hours. The resulting mixed methyl ethyl cellulose shows the high qualities characteristic of other ethers produced by this general procedure.

*Example 9*

The procedure is similar to that of Example 1 with the exception that a mixed benzyl ethyl cellulose is prepared by treating the alkali cellulose with a mixture of benzyl and ethyl chlorides.

Two hundred and thirty-six parts solid caustic soda, 119 parts of water, 560 parts of benzene, and one part of benzyl ethyl cellulose are mixed at about 70° C. to produce an emulsion. To the emulsion is then added 100 parts of granulated wood pulp board and the mixture agitated for one hour at 70°–90° C. One hundred and eighty parts of ethyl chloride and 190 parts of benzyl chloride are added. The resulting mixture is agitated for four hours at 120° C., the temperature is gradually raised over a period of one hour to 135° C. and then maintained at this point for six hours. The resulting ethyl benzyl cellulose, when purified by the known procedures, produces smooth solutions of good clarity and freedom from usual fibers and gives films of excellent toughness and water resistance.

*Example 10*

In this example, ethyl butyl cellulose is prepared, using the alkali cellulose of the new process.

Thirteen hundred and thirty parts of caustic soda, 1620 parts of water, 1000 parts of benzene, and 5 parts of ethyl butyl cellulose are mixed vigorously at ordinary temperature to produce an emulsion. To the emulsion is added 530 parts of granulated pulp board and the mixture is agitated for about one hour. This intimate mixture of cellulose and alkali is treated with 590 parts of ethyl chloride and heated and agitated for six hours at 100°–116° C. The mixture is then treated with 1218 parts of butyl chloride and heated and agitated for ten hours at 135° C. to 140° C. The resulting ethyl butyl cellulose is purified in the known manner. It possesses qualities similar to the previously described ethers.

*Example 11*

Alkali cellulose of high alkali content prepared as in Example 1 is reacted with ethylene oxide and ethyl chloride simultaneously in this example.

Two hundred and thirty-six parts of solid caustic soda, 119 parts of water, 560 parts of benzene, and one part of ethyl cellulose are mixed thoroughly at 70° C. To the resulting emulsion is added 100 parts of granulated pulp board and the mixture is agitated at 70°–90° C. for one hour. Twenty-seven parts of ethylene oxide and 280 parts of ethyl chloride are added. The mixture is agitated and heated gradually to 150° C. over a period of 3–4 hours and maintained at this temperature for about seven hours. The resulting mixed cellulose ether is very uniform, has excellent solubility in a number of solvents, e. g., alcohol, acetone, toluene-alcohol, benzene-alcohol, and gives films of good clarity and excellent toughness. Ethylene chlorohydrin may be used in place of ethylene oxide.

*Example 12*

This example illustrates the use of upper preferred (for cellulose ether manufacture) caustic and water ratios for preparing the high-alkali low-water alkali cellulose.

Four hundred parts of solid caustic soda, 270 parts of water, 550 parts of benzene, and one part of ethyl cellulose are agitated in an autoclave for about one hour at 65°–75° C. To the resulting dispersion of caustic solution in benzene is added one hundred parts of granulated pulp board. This mixture is agitated for about one hour at 70°–90° C. Four hundred parts of ethyl chloride is added and the mixture is agitated and heated for eight hours at 150° C. The resulting ethyl cellulose gives films and plastics of especial toughness.

*Example 13*

This example illustrates the low preferred ratio of water.

Two hundred parts of solid caustic soda, 50 parts of water, 500 parts of toluene, and one part of ethyl cellulose are mixed at 95° C. for one hour. To the resulting dispersion of alkali in toluene is added 100 parts of high alpha cellulose granulated pulp board (high alpha cellulose pulp board cut into chips about ⅛ x 1/16 x 1/16") and the mixture is stirred for about one hour. Two hundred and eighty parts of ethyl chloride is added and the resulting mixture is agitated and gradually heated from 95° C. to 120° C. over a period of one hour, maintained at 120° C. for five hours, the temperature then gradually raised to 145° C. over a period of two hours and maintained at 145°–150° C. for five additional hours. The resulting ethyl cellulose has very desirable characteristics as a base for films, plastics, and coating compositions.

Example 14

This example illustrates a modification of the new process, in which some of the alkali is added after the etherification reaction has started.

Fifty parts of water, 105 parts of caustic soda, 566 parts of benzene, and one part of ethyl cellulose are mixed and warmed at 70° C. until the caustic dissolves in the water and the resulting caustic solution is emulsified with the benzene. To this emulsion is added 100 parts of granulated pulp board and the mixture agitated for one hour at 70–90° C. Ten parts of sodium carbonate and 260 parts of ethyl chloride are added. The purpose of the sodium carbonate is to insure an alkaline condition in the reaction mixture at all times, since during the early stages of the reaction the ethyl chloride is present in excess over the amount of caustic alkali present. The mixture is heated gradually from 90° C. to 150° C. over a period of two hours and held at 150° C. for eight hours. During the heating period, 130 parts of caustic soda is gradually introduced. This additional caustic alkali may be added as a solid in the form of powder or as a slurry in an inert organic liquid, or as a highly concentrated solution in water or as an emulsion of a caustic solution in an inert liquid.

Example 15

This example illustrates the use of the new process in the preparation of low substituted glycol cellulose.

Fifty parts of solid caustic soda, 184 parts of water, 560 parts of benzene, and one part of ethyl cellulose are mixed at ordinary temperature. The resulting emulsion is treated with 100 parts of granulated cotton linter board (made by cutting cotton linter board into small pieces) and the mixture is agitated at ordinary temperature for about one hour. To the resulting alkali cellulose is added 12 parts of ethylene oxide. The resulting mixture is agitated for six hours at ordinary temperature. The glycol cellulose formed is washed with benzene to remove the ethyl cellulose and then the benzene is removed by evaporation. The residue consists of a mixture of glycol cellulose and alkali. Upon dilution of this mixture with water, the glycol cellulose dissolves in the resulting dilute alkaline solution. Cooling may be used to facilitate the dissolving of the glycol cellulose. The resulting glycol cellulose may be used for the spinning of rayon and casting of films.

Example 16

This example illustrates the addition of a wetting agent to granulated pulp board.

Two hundred and thirty-six parts of solid caustic soda, 119 parts of water, 566 parts of benzene are mixed and heated to 70° C. over a period of about one half hour, forming an emulsion of a very concentrated caustic alkali solution in benzene. One hundred parts of granulated pulp board containing about one per cent (based on the cellulose) of "Alkanol-M" are violently mixed with the foregoing emulsion for about one hour at a temperature of 70–90° C. Two hundred and eighty parts of ethyl chloride are added and the resulting mixture, while continually agitating, is heated gradually to 150° C. over a period of two hours and maintained at this temperature for five hours. The resulting ethyl cellulose is isolated from the reaction mixture and purified in the known manner. The product dissolves in toluene-alcohol and a number of other solvents. The resulting solutions have a high degree of clarity and are practically colorless. Plastics sheeting manufactured from this material is characterized by a high degree of clarity and substantial freedom from color.

The procedure may be varied by adding one part of sodium isobutyrate to the 119 parts of water in place of adding "Alkanol-M" to the cellulose. Alkali stable wetting agents in general may be employed.

Example 17

This illustrates the use of fifty per cent caustic solution as the source of the water and part of the caustic.

Two hundred and thirty-eight parts of 50 per cent caustic soda solution, 117 parts of solid caustic soda, 560 parts of benzene, and one part of ethyl cellulose are violently stirred and heated to 70° C. The solid caustic soda dissolves completely and the resulting very highly concentrated caustic alkali solution is emulsified with the benzene. One hundred parts of granulated pulp board containing two per cent "Alkanol-M" are introduced into the foregoing emulsion while agitating the mass and mixing is continued for about one half hour at 70°–90° C. Two hundred and eighty parts of ethyl chloride are added and the resulting mixture, continuously agitated, is heated to 150° C. over a period of about two hours and maintained at this temperature for four to five hours. The resulting ethyl cellulose, after isolation and purification in the known manner, possesses the very high qualities described previously.

The present invention is not limited to the foregoing examples but may be operated in various ways illustrated by the following modifications.

For the production of cellulose ethers of the highest quality, it is desirable that air (oxygen) be substantially absent from the ingredients in the reaction vessel. Advantage is gained in this direction by the use, in the present process, of granulated pulp board since, due to its high density, this type of cellulose is more or less completely submerged in the diluent and etherifying agent. Furthermore, during the preparation of the emulsion most of the air is driven out of the reaction vessel by the vapors of the diluent prior to the addition of the cellulose. In order to eliminate entirely the possibility of oxidation of the alkali cellulose mixture, the reaction vessel may be evacuated of air.

The type of cellulose is not limited to cotton linters and wood pulps but includes cellulose from other sources, such as cotton hulls, bagasse, ramie, flax, regenerated cellulose, and other cellulosic materials. Cellulose pretreated in various ways may be used, for example, cellulose pretreated with acids, such as formic, acetic, nitric, or sulfuric acid. Hydrocellulose or oxycellulose are of interest as a means of producing directly low viscosity ethyl cellulose. Cellulose in the form of dense chips is preferred, but the advantages of the invention are realised also, tho not to so great an extent, when using cellulose in other forms. In the use of dense cellulose, the density or compactness of the pulp board may be varied. It is preferable to use sheets of moderate or low degrees of compactness. Cellulose regenerated from viscose, cuprammonium, and other solutions may be used. In place of cellulose, low-substituted cellulose derivatives may be used as the starting material. When cellulose is used in the form of dense chips, the previous incorporation of a wetting agent therein facilitates the distribution of the alkali. However, the wetting agent may be added to the reaction mixture.

Definite advantages are gained by the use, in the emulsion process, of granulated pulp board. Granulated pulp board of the desired characteristics may be obtained by cutting commercial pulp board into chips. However, in order to gain advantages from the use of this type of cellulose, it is necessary that the pulp board and the chips have certain definite characteristics. The granulated cellulose suitable for the purpose may be characterized by (1) certain dimensions of the individual granules, (2) a certain degree of compactness of the pulp board, and (3) a certain apparent bulk density. Granules of the desired characteristics may be obtained by cutting pulp board of a degree of compactness of 80 and a thickness of $\frac{1}{16}$" into $\frac{1}{8}$" squares, thus forming granules $\frac{1}{8}$" x $\frac{1}{8}$" x $\frac{1}{16}$" with an apparent bulk density of about 16 pounds per cu. ft. Granules of this general type are hereafter referred to as granulated pulp board. The degree of compactness is expressed in the customary way used in the paper trade, as the ratio of the weight in pounds of 415,000 square inches of board to 100 times the thickness in inches. Obviously, the compactness might be expressed in other ways. However, all values of this characteristic given herein are calculated by the foregoing method. The apparent bulk density is obtained by determining the weight of granules held by a container of known capacity. The present invention, so far as granulated cellulose is concerned, is not limited to the more or less regular granules obtained by cutting pulp board but includes granules produced in other ways. For example, suitable granules may be made by shredding wet pulp, containing about 40–70 per cent bone dry cellulose, and then, with or without screening, drying the disintegrated pulp. Produced by such a method, the granules are of irregular shapes but they may be made to possess the required compactness and apparent bulk density.

The degree of compactness of granulated cellulose may be varied. Granules of a compactness of 40–125 calculated as described previously may be used, although the range of 50 to 115 is preferred. With reference to the size of granules, the use, in the case of granulated pulp board, of squares not appreciably larger than $\frac{1}{2}$" square is preferred. The thickness of the squares may be varied but board within the limits of 0.02–.115" thickness may be used. Pulp board within the range of 0.04–0.08" thickness is preferably used. Thus, for example, a thickness of $\frac{1}{16}$" is very satisfactory. In the case of irregular granules prepared, for example, from moist pulp, the size should be such that the volume of the individual granules will not exceed appreciably 0.05 cu. in. The apparent bulk density of the granulated cellulose, when packed under its own weight, should not be less than eight pounds per cu. ft.

The etherification may be conducted under a wide variety of conditions as regards time and temperature. The conditions to be used vary with the particular cellulose ether being prepared and the etherifying agent used. Thus, with ethyl cellulose using ethyl chloride reaction temperatures may, for example, vary from 90° to 170° C. and the time from 4 to 24 hours.

For the emulsion, inert organic diluents immiscible with aqueous caustic solution may be employed, including, in addition to benzene, toluene, or ether, other diluents such as low boiling gasoline, xylene, dibutyl ether, dibenzyl ether, dipropyl ether, dioxan, and the like.

Any alkali metal hydroxide may be used. Thus, caustic potash or mixtures of caustic potash and caustic soda may be used.

From the examples which have been given it is evident that the alkali cellulose made by the process of this invention may be used in the preparation of cellulose ethers of various types by selection of the appropriate etherifying agents, for example, alkyl, aralkyl, aryl, alkoxy-alkyl, etc. As etherifying agents the organic halide, sulfate, sulfonate, or the like, corresponding to the desired ether, e. g., ethoxyethyl chloride, methyl sulfate, ethyl p-toluenesulfonate, sodium methylsulfate, benzyl chloride, sodium ethylsulfate, sodium chloroacetate, ethylene chlorohydrin, and the like may be used.

Although extremely fine dispersions of the caustic solution in the diluent may be obtained simply by efficient mixing, the use of an emulsifying or dispersing assistant facilitates the emulsification step. Emulsifying assistants in general may be used but it is preferable to use a material which is of the same general character as the desired product or which will not involve difficulty in subsequent purification of the product. The more suitable emulsifying assistants include ethyl cellulose, benzyl cellulose, butyl cellulose, glyco ceulose, cellulose glycolic acid, methyl cellulose, and the like.

Wetting agents stable, i. e., functioning as such in alkali, may in general be employed to facilitate the wetting of the cellulose by the alkali emulsion. The "Alkanol-M" mentioned in the above examples consists of the sodium salts of acids prepared by the oxidation of the mixture of oxygenated organic compounds obtained by the catalytic hydrogenation of carbon oxides under elevated temperatures and pressures. Salts of varying characteristics are obtained from different fractions of the alcohols thus obtained, the salts of acids of 4 to 8 carbon atoms being particularly useful. These acids may be obtained by the process of U. S. Patent 1,856,263 or by the two step oxidation of the alcohols to the acids, and are representative of alkali stable wetting agents in general. Other suitable alkali stable wetting agents include sodium isobutyrate, sodium laurylsulfate, sulfonated castor oils of the Turkey red oil type, sodium or other alkali salts of alkylated naphthalenesulfonic acids, of sulfonated petroleum, of sulfonated fish oils, etc.

The wetting agent may be added as a pretreatment for the cellulose or it may be introduced at other points in the process as (1) addition separately with the water, alkali and benzene prior to formation of the emulsion, (2) addition as a solution in the water added to the reaction vessel, and (3) introduction as a solid or aqueous solution into the caustic-benzene emulsion prior to mixing the cellulose therewith. These methods of adding the wetting agent facilitate the formation of the alkali cellulose as well as facilitate the subsequent etherification reaction. The etherification reaction may be benefited also by the addition of the wetting agent subsequent to the formation of the alkali cellulose.

In the preparation of cellulose ethers for transparent films, one of the greatest difficulties which the art has experienced has been the existence of so-called "haze", the cause of which is not clearly understood. It may be said however that there are probably a number of factors which combine to make the transparency of the finished product something less than perfect. While I do not commit myself to any particular theory to account for the superior quality of my product in comparison with the products of the prior art, I believe that these qualities are most probably connected with the fact that the emulsion method effects a remarkably uniform distribution of the alkali thruout the cellulose and that it eliminates the step of shredding the press cake, an operation which ordinarily results in the formation of nodules of alkali cellulose which resist uniform penetration of the etherifying agent. It is probable also that an important factor in the success of this invention is the fact that the emulsion process avoids injury to the cellulose by effecting the intimate mixture of the cellulose, alkali, and water in any required proportion without grinding or shredding and without subjecting the cellulose at any point to the combined effect of hot concentrated alkali and air. The new process has greatly simplified the manufacture of high quality ethers as it avoids the various tedious and time-consuming steps of the prior art that are directed toward the same end. Furthermore, products made by the new process, particularly ethyl cellulose, are greatly superior to previous products as regards freedom from material causing haziness in the final plastic. Thus, representative films of ethyl cellulose prepared by impregnation of cellulose with caustic alkali solution, pressing out excess alkali solution, incorporating additional solid caustic, ethylating and separating and using the portion freest from haze had a haziness, measured in arbitrary units, of about 27 while films of ethyl cellulose prepared by the process of the present invention but otherwise comparable had a haziness of approximately 12.

The cellulose ethers manufactured by the present invention are of a very high quality and especially suited to the manufacture of plastics, including safety glass sheeting, molded articles, films, transparent foils for wrapping and other purposes, lacquers, coating of fabrics, electrical insulation material, and the like.

The above description and examples are intended to be illustrative only. Any modification of or variation therefrom which conforms to the spirit of the invention is intended to be included within the scope of the claims.

I claim:

1. Process for the preparation of cellulose ethers, which comprises emulsifying caustic soda and water in an inert organic diluent, intimately mixing granulated wood pulp with the emulsion and reacting the intimate mixture of cellulose and alkali with an etherifying agent.

2. Process for the preparation of alkyl ethers of cellulose, which comprises emulsifying caustic soda and water in an inert organic diluent, intimately mixing granulated wood pulp with the emulsion and reacting the intimate mixture of cellulose and alkali with an alkylating agent.

3. Process for the preparation of ethyl cellulose, which comprises emulsifying caustic soda and water in benzene, intimately mixing granulated wood pulp with the emulsion and reacting the intimate mixture of cellulose and alkali with ethyl chloride.

4. Process for the preparation of ethyl cellulose, which comprises emulsifying caustic soda and water in benzene, intimately mixing cellulose with the emulsion and reacting the intimate mixture of cellulose and alkali with ethyl chloride.

5. Process for the preparation of alkyl ethers of cellulose, which comprises emulsifying caustic soda and water in an inert organic diluent, intimately mixing cellulose with the emulsion and reacting the intimate mixture of cellulose and alkali with an alkylating agent.

6. Process for the preparation of cellulose ethers, which comprises emulsifying caustic soda and water in an inert organic diluent, intimately mixing cellulose with the emulsion and reacting the intimate mixture of cellulose and alkali with an etherifying agent.

7. Process of claim 6 wherein the cellulose is in the form of granulated pulp board.

8. Process of claim 6 wherein the process is carried out with the use of an emulsifying assistant such as ethyl cellulose.

9. In the preparation of cellulose ethers, the step which comprises intimately mixing cellulose with an emulsion of aqueous caustic alkali solution in an inert organic liquid.

10. In the preparation of cellulose ethers, the step which comprises agitating caustic soda, water, and an inert organic liquid until an emulsion forms and intimately mixing cellulose with said emulsion.

11. In the preparation of cellulose ethers, the step which comprises agitating caustic alkali, water, and an inert organic liquid until an emulsion forms and intimately mixing cellulose with said emulsion.

12. Process of claim 11 wherein the cellulose is in the form of granulated pulp board.

13. Process of claim 11 wherein the process is carried out with the use of an emulsifying assistant such as ethyl cellulose.

14. Process of claim 11 wherein a wetting agent is used.

15. Process for the preparation of an intimate mixture of cellulose and a solution of caustic soda of high alkali and low water content, which comprises agitating and heating a mixture of 80–150 parts of water, caustic soda in amount at least 1.25 times that of the water, and an inert liquid until an emulsion forms, and then intimately mixing 100 parts of cellulose with the emulsion.

16. Process for the preparation of an intimate mixture of cellulose and a solution of caustic alkali of high alkali and low water content, which comprises agitating and heating a mixture of 80–150 parts of water, caustic soda in amount at least 1.25 times that of the water, and an inert liquid until an emulsion forms, and then intimately mixing 100 parts of cellulose with the emulsion.

17. Process for the preparation of an intimate mixture of cellulose, caustic alkali and water of high alkali content and low water content, which comprises forming an emulsion of caustic alkali, water and benzene, containing 80–150 parts of water, caustic alkali in amount at least 1.25 times that of the water and intimately mixing 100 parts of cellulose with said emulsion.

18. In the process of preparing alkali cellulose to contain a required proportion of cellulose, water, and alkali, the step which comprises dissolving the required amount of alkali in the required amount of water using no excess of either constituent and heating if necessary to effect solution, emulsifying the resultant aqueous solution of caustic alkali in an inert liquid and mixing said emulsion with the cellulose.

19. In the process of preparing alkali cellulose to contain a required proportion of cellulose, water and alkali, the step which comprises emulsifying a solution of caustic alkali of mercerizing concentration in an inert liquid, said solution of caustic alkali containing the required amount of water and a portion of the required amount of alkali, mixing the cellulose with said emulsion, adding the remainder of the required alkali and continuing the agitation until a uniform suspension of alkali cellulose in inert liquid is obtained.

20. The process of preparing cellulose ether which comprises preparing a suspension of alkali cellulose in an inert liquid by the process of claim 18, adding the etherifying agent and heating until the etherifying reaction is complete.

21. The process of preparing cellulose ether which comprises preparing a suspension of alkali cellulose in an inert liquid by the process of claim 19, adding the etherifying agent and heating until the etherification reaction is complete.

22. Process for the preparation of alkali cellulose by intimately mixing cellulose and a solution of caustic alkali, which comprises emulsifying an aqueous solution of caustic alkali containing no excess of water or caustic alkali over that desired in the alkali cellulose in an inert organic liquid to disperse the caustic alkali solution in the form of fine globules and mixing cellulose fibers with the emulsion to transfer the fine globules of caustic alkali solution from the inert organic liquid to the cellulose.

23. The process of claim 22 wherein the cellulose is in the form of granulated pulp board, and the process is carried out with the use of an emulsifying assistant.

FREDERICK C. HAHN.